United States Patent [19]
Yamada

[11] 3,965,780
[45] June 29, 1976

[54] WORK REST DEVICE FOR USE IN A CRANK PIN MILLER

[75] Inventor: Shingo Yamada, Komatsu, Japan

[73] Assignee: Kabushiki Kaisha Komatsu Seisakusho, Tokyo, Japan

[22] Filed: July 17, 1975

[21] Appl. No.: 596,667

[30] Foreign Application Priority Data
July 17, 1974 Japan................................ 49-81174

[52] U.S. Cl.................................... 82/9; 82/38 R
[51] Int. Cl.².................... B23B 5/18; B23B 25/00
[58] Field of Search....................... 82/9, 38 R

[56] References Cited
UNITED STATES PATENTS

| | | | |
|---|---|---|---|
| 666,040 | 1/1901 | Tindel et al.................... | 82/9 |
| 1,067,143 | 7/1913 | Schellenbach................. | 82/38 R |
| 2,182,228 | 12/1939 | Groene et al.................. | 82/9 X |
| 2,522,084 | 9/1950 | Baruch............................ | 82/9 |
| 3,621,740 | 11/1971 | Thomas.......................... | 82/38 R |
| R19,905 | 3/1936 | Groene et al.................. | 82/9 |

Primary Examiner—Harrison L. Hinson
Attorney, Agent, or Firm—Armstrong, Nikaido & Wegner

[57] ABSTRACT

A work rest device for use with a crank pin miller comprises a pair of bodies, longitudinally and transversely movable saddles mounted on a bed, cutter main spindle boxes each having a cutter, said cutter main spindle boxes and said bodies being mounted on respective saddles, pawls disposed within each body to clamp main journal parts adjoining pin journal parts to be cut by said cutter, ring gears, and drive gears each having recesses and disposed within respective ring gear. The pawls are engaged with the respective recesses, and arranged to be moved back and forth by rotating the ring gear. The device further includes work main spindle boxes adapted to carry both ends of the work and having each a chuck. Arrangement is made such that the rotation of the ring gear is in synchronism with that of the associated chuck.

5 Claims, 9 Drawing Figures

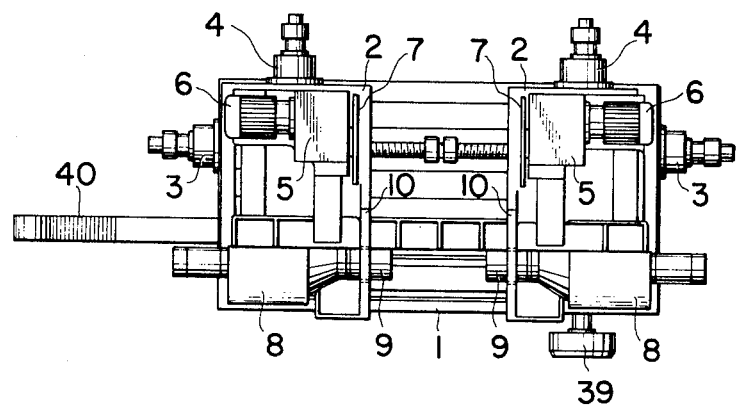
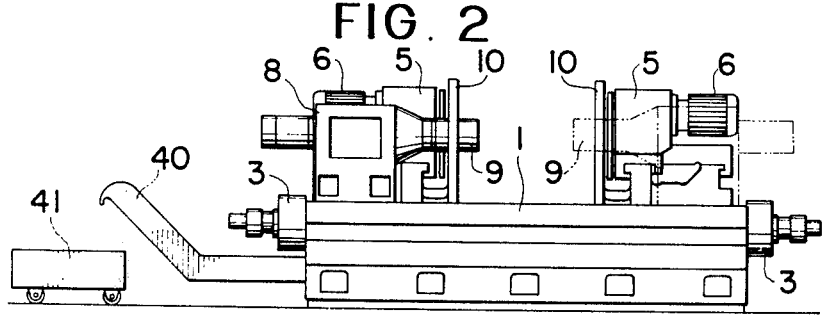

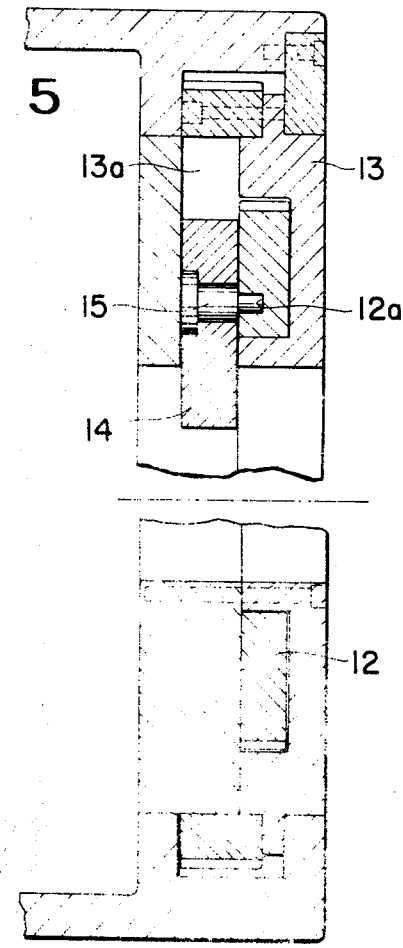

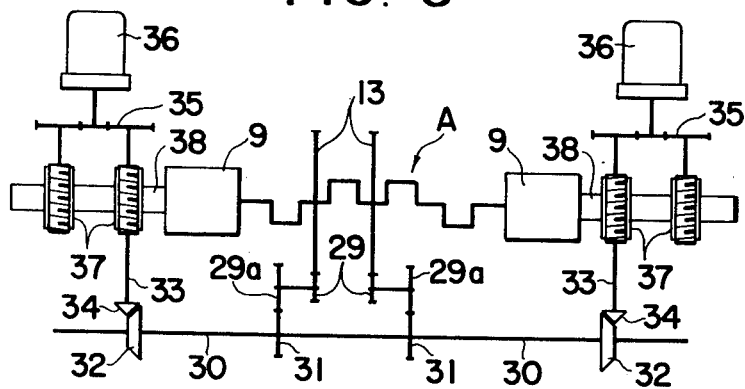
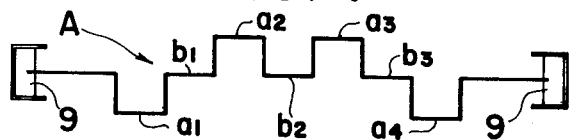
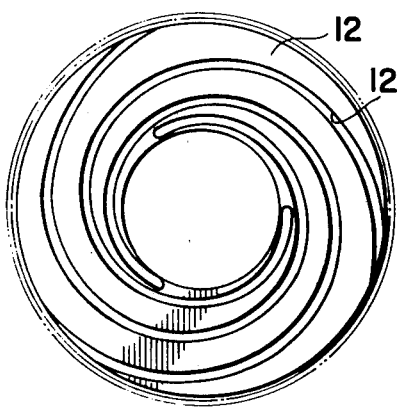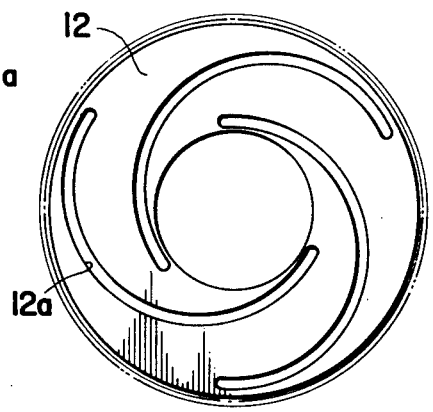

WORK REST DEVICE FOR USE IN A CRANK PIN MILLER

BACKGROUND OF THE INVENTION

1. Field of the Invention

This invention relates to a work rest device, and more particularly to a work rest device for carrying an work to be cut in a crank pin miller for forming a crankshaft.

2. Description of the Prior Art

In the conventional crank pin miller for cutting a crankshaft which is a principal part of an engine, the work to be cut is carried at several places thereof by means of a journal rest device, and the work is cut while it is rotated. In such conventional structure for merely carrying the journal parts, the work cannot be clamped satisfactorily so that the vibration caused during cutting operation cannot be prevented. As a result, cutting speed cannot be increased so that no improvement in productivity can be achieved. Furthermore, it is necessary to move the rest device depending on the size of the work to be cut so that much time and labor is required for the preparation of cutting which results in a deterioration in work efficiency.

SUMMARY OF THE INVENTION

The present invention is intended for eliminating the above-mentioned disadvantage, and has for its object to provide a work rest device for a crank pin miller wherein a body of the rest device is mounted on the saddle of a cutter spindle so that the body can always be moved together with the cutter spindle, and the work to be cut is carried in such a manner that the portion slightly ahead of the journal part is always supported, whereby achieving an improvement in productivity and simplifying the preparation step prior to work cutting operation.

BRIEF DESCRIPTION OF THE DRAWINGS

The present invention will now be described by way of example with reference to the accompanying drawings in which:

FIG. 1 is an overall plan view of a crank pin miller,

FIG. 2 is a side elevational view of the crank pin miller of FIG. 1,

FIG. 5 shows in detail the engagement between a drive gear, ring gear and one of pawls, FIG. 6 is a schematic drawing showing the operational relationship between chucks and the work rest device, FIG. 7 is an explanatory view of a work to be cut, and FIGS. 8 and 9 are explanatory views of alternative embodiments of recesses formed in the drive gear for driving the pawls, respectively.

DESCRIPTION OF THE PREFERRED EMBODIMENT

Figure 3:
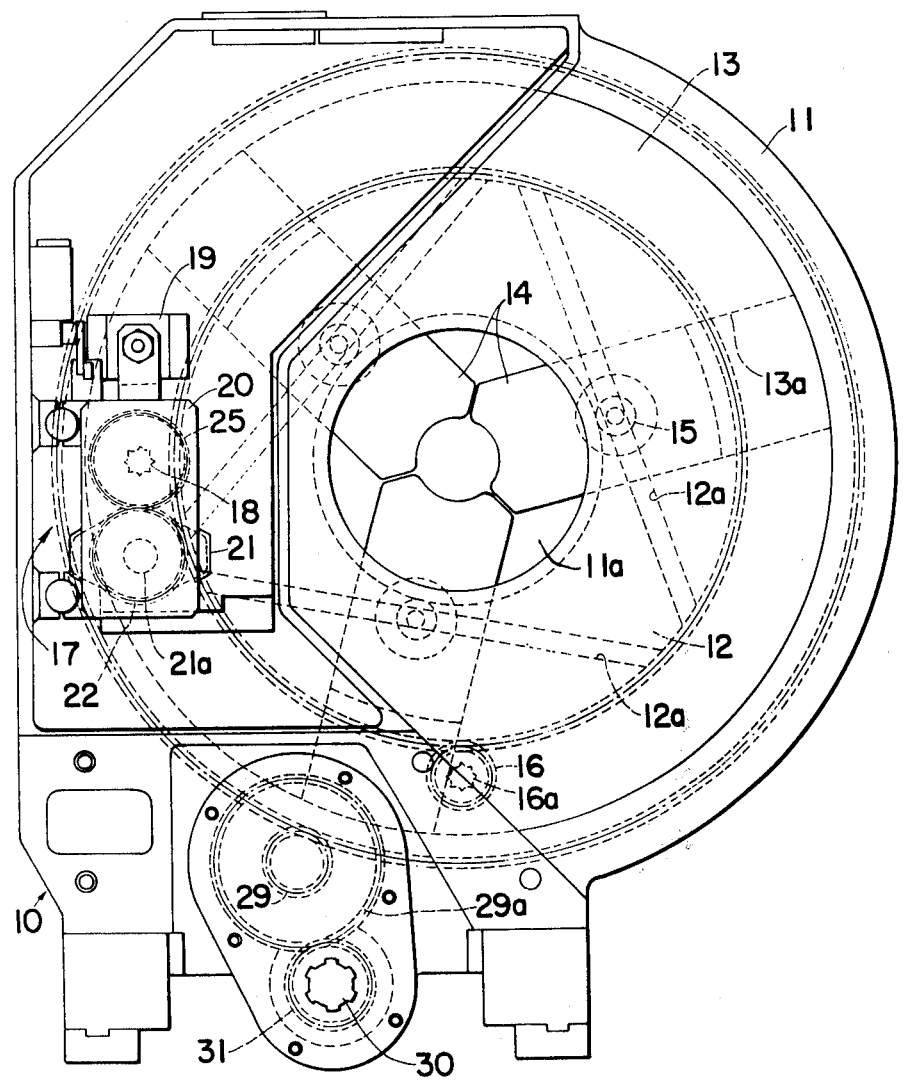
FIG. 3 is a front view of a work rest device according to the present invention.

Referring to FIGS. 1 and 2, numeral 1 denotes a crank pin miller bed. Two sets of saddles 2 are independently mounted on the bed 1. These saddles 2 can be freely moved in a longitudinal direction of the bed 1 by means of a longitudinal feed means 3 and moved in a transverse direction of the bed 1 by means of a transverse feed means 4, respectively. Mounted on each of the saddles 2 is a cutter main spindle box 5. On each of the cutter main spindle boxes 5 there is mounted a cutter 7 which is rotated by a main spindle motor 6. Mounted in front of each cutter main spindle box 5 is an work main spindle box 8 adapted to rotate a work (not shown) to be cut. Mounted on the opposite sides of the work main spindle boxes 8 are chucks 9 adapted to clamp the ends of the work. In the proximity to each of the chucks 9, there is provided a main body 10 of a work rest device on each of the saddles 2, and the main body 10 can be moved along the work simultaneously with the longitudinal movement of the saddle 2.

Figure 4:
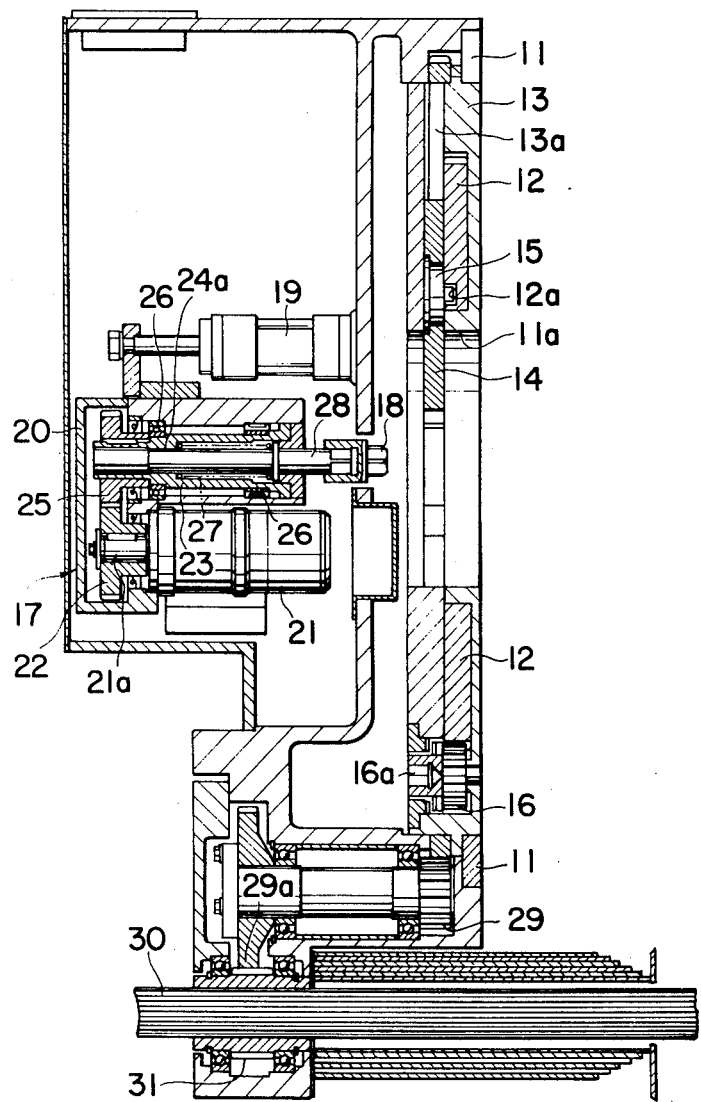
FIG. 4 is a sectional view of the work rest device of FIG. 3.

Referring to FIGS. 3 to 5, the main body 10 has formed therein an annular part 11 in which a drive gear 12 and a ring gear 13 are accommodated. The drive gear 12 has, for example, three recesses 12a formed therein in a triangular shape. With each of the recesses 12a is engaged each end of respective sliders 15 of pawls 14, respectively. In the embodiment shown, there are provided, for example, three pawls 14 which are slidably inserted in guide grooves 13a, respectively, of the ring gear 13 disposed adjacent to the drive gear 12. When the drive gear 12 is rotated, the leading ends of the pawls 14 are projected into and retracted from a central hole 11a of the annular part 11 so as to clamp main journal parts of the work to be cut. The recesses 12a formed on one side of the drive gear 12 may be formed in spiral or arcuate shape as shown in FIGS. 8 and 9. The drive gear 12 is engaged by pinion gear 16 having a polygonal hole 16a formed in the central part thereof. A nut runner 18 of a nut runner mechanism 17 can be engaged with or disengaged from the polygonal holes 16a of the pinion gears 16. The nut runner mechanism 17 has a box 20 which can be freely moved towards and away from the drive gear 12 by means of an oil hydraulic cylinder 19. The box 20 houses an oil hydraulic motor 21 therein. The oil hydraulic motor 21 has a rotating shaft 21a to which is fixedly secured a gear 22. The gear 22 is engaged by a gear 25 which is secured to one end of a spring cylinder 24. The spring cylinder 24 is rotatably carried within the box 20 by means of bearings 26. Mounted within the spring cylinder 24 is a nut runner shaft 28 which is normally biased towards the pinion gears 16 by the resilient force of a spring 27. The nut runner shaft 28 is engaged with the spring cylinder 24 at spline 24a.

Whilst, the ring gear 13 accommodated in the annular part 11 of the body 10 is engaged by a gear 29 in the lower part of the annular part 11. The gear 29 is coaxially mounted with the gear 29a so as to rotate with the latter. The gear 29a is engaged by a gear 31 which is engaged with a spline shaft 30 mounted longitudinally of the bed 1, so that the rotation of the spline shaft 30 can be transmitted to the ring gear 13. Fixedly secured to both ends of the spline shaft 30 are bevel gears 32, respectively, as shown in FIG. 6. The bevel gears 32 are engaged, respectively, with bevel gears 34 which are fixedly secured to the lower ends of worm shafts 33. Each of the worm shafts 33 is operably connected through a gear train 35 with a pulse motor 36. Each main spindle 38 having a chuck 9 mounted within the work main spindle box 8 is arranged to be rotated by the pulse motor 36 through worm gears 37. In FIG. 1, reference numeral 39 represents an operating panel mounted in front of the bed 1, 40 a chip conveyor for removing the chip produced during cutting operation, and in FIG. 2, 41 a chip tank in which chip is stored.

In cutting pin journal portions $a_1$ and $a_3$ of a work A as shown in FIG. 7, both ends of the work A are at first held between and by the checks 9 mounted in front of the main spindles 38. Subsequently, the box 20 is moved forwardly towards the drive gear 12 by means of the hydraulic cylinder 19 of the nut runner mechanism 17 so that the leading end of the nut runner 18 is engaged with the polygonal hole 16a of the pinion gear 16. When the oil hydraulic motor 21 is rotated, the drive gear 12 is rotated within the ring gear 13 so that the pawls 14 are moved forwardly towards the central part through the sliders 15 engaged with the recesses 12a formed in the drive gear 12 whereby clamping main journal parts $b_1$ and $b_2$ adjoining the pin journal parts $a_1$ and $a_3$ to be cut.

When the clamping has been completed, the box 20 is again moved backwards by means of the oil hydraulic cylinder 19 so that the nut runner 18 is disengaged from the pinion gear 16, and main spindle motors 38 and the pulse motors 36 are rotated to rotate thereby the cutters 7 and the work A. The rotation of the chucks 9 are transmitted to the spline shaft 30 to rotate thereby the latter, and the ring gear 13 disposed within the annular part 11 is rotated at the same speed as the chucks 9 by the spline shaft 30 through the gears 31, 29a, and 29, so that the pin journal parts $a_1$ and $a_3$ are cut by the cutters 7 while the main journal parts $b_1$ and $b_2$ adjacent to the pin journal parts $a_1$ and $a_3$ to be cut are carried by the chucks 9 and the pawls 14. Therefore, it is possible to prevent vibration of the work A during cutting operation. In the similar manner, when cutting the pin journal parts $a_2$ and $a_4$, the main journal parts $b_2$ and $b_3$ are clamped by means of the pawls 14 so that the work A can be cut without generating vibration during cutting operation.

As mentioned hereinabove, according to the present invention, pawls are provided to transmit the rotation thereof to the chucks carrying both ends of an work to be cut, and the main journal parts adjoining the pin journal parts to be cut are clamped by the pawls so as to endure the reaction force generated during cutting operation. Therefore, as compared with the conventional mechanism wherein main journal parts are merely supported by bearings, the vibration caused during cutting operation can be remarkably reduced whereby an increase in the cutting speed and an improvement in the work efficiency can be achieved. Further, the body of the rest device is mounted on the saddles on which cutter main spindle boxes are mounted so that the main journal parts adjacent to the pin journal parts being cut can be always rigidly carried unlike the conventional art which requires manual changes in supporting locations depending on the kind of the work to be cut. Consequently, no preparation step before cutting operation is needed so that work efficiency can be remarkably improved.

It is to be understood that the above description is by way of example only, and that details for carrying the invention into effect may be varied without departing from the scope of the invention claimed.

What is claimed is:

1. A work rest device for use in a crank pin miller which comprises;
    a pair of saddles mounted on a bed of the miller and moved in longitudinal and transverse directions of the bed;
    a pair of main bodies of said device mounted on said saddles, respectively, each of said bodies having a work clamping means for clamping a main journal part of a work adjoining a pin journal part of the work to be cut;
    a spline shaft connected through gears to an electric motor for rotating said work; and
    a gear train provided between said work clamping means and said spline shaft for rotating said work clamping means at the synchronous rotating speed with that of said work.

2. The work rest device as set forth in claim 1, wherein said work clamping means comprises;
    a ring gear rotatably mounted on said main body of the device and engaged with one of gears of said gear train;
    a drive gear rotatably provided coaxially with and adjacent to said ring gear;
    a plurality of guide grooves formed in the side face of said drive gear;
    a plurality of pawls slidably provided between said main body and said drive gear for clamping said main journal part of the work, each of said pawls having a slider of which the distal end thereof is engaged with one of said guide grooves of said drive gear so as to slide said pawl in the radial direction of said drive gear when the drive gear is rotated;
    a pinion gear having a polygonal hole formed in the central portion thereof and said pinion gear being engaged with said drive gear; and
    a nut runner mechanism including therein a nut runner engaged with and disengaged from said polygonal hole of said pinion gear and an oil hydraulic motor for rotating said nut runner.

3. The work rest device as set forth in claim 2, wherein said guide grooves are three straight grooves forming a triangle.

4. The work rest device as set forth in claim 2, wherein said guide grooves are three arcuate grooves.

5. The work rest device as set forth in claim 2, wherein said guide grooves are three spiral grooves.

* * * * *